(12) United States Patent
Uejima

(10) Patent No.: US 8,160,511 B2
(45) Date of Patent: Apr. 17, 2012

(54) LOW-VOLTAGE CONTROL HIGH-FREQUENCY SWITCH AND COMPOSITE HIGH-FREQUENCY COMPONENT

(75) Inventor: Takanori Uejima, Moriyama (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 139 days.

(21) Appl. No.: 12/787,414

(22) Filed: May 26, 2010

(65) Prior Publication Data

US 2010/0226355 A1    Sep. 9, 2010

Related U.S. Application Data

(63) Continuation of application No. PCT/JP2008/065237, filed on Aug. 27, 2008.

(30) Foreign Application Priority Data

Nov. 28, 2007    (JP) ................................. 2007-307982

(51) Int. Cl.
    *H04B 1/44*        (2006.01)
    *H04B 1/46*        (2006.01)
(52) U.S. Cl. .................... 455/83; 455/552.1; 455/553.1; 455/78; 455/82; 333/132
(58) Field of Classification Search .............. 455/552.1, 455/553.1, 78, 82, 83
See application file for complete search history.

(56) References Cited

U.S. PATENT DOCUMENTS

| 7,027,777 | B2 * | 4/2006 | Uriu et al. ...................... 455/78 |
| 7,295,814 | B2 * | 11/2007 | Yamashita et al. .............. 455/83 |
| 2003/0189910 | A1 * | 10/2003 | Yamada et al. ............... 370/335 |
| 2005/0048927 | A1 * | 3/2005 | Kemmochi et al. ............. 455/78 |

FOREIGN PATENT DOCUMENTS

| EP | 1 003 291 A2 | 5/2000 |
| GB | 2 449 818 A | 12/2008 |
| JP | 62-68324 U | 4/1987 |
| JP | 2000-165274 A | 6/2000 |
| JP | 2003-188762 A | 7/2003 |
| WO | 2007/114114 A1 | 10/2007 |

OTHER PUBLICATIONS

Official Communication issued in International Patent Application No. PCT/JP2008/065237, mailed on Oct. 14, 2008.
Nakagawa et al., "Low-Voltage Control High-Frequency Switch and Composite High-Frequency Component," U.S. Appl. No. 12/203,991, filed Sep. 4, 2008.
Official Communication issued in corresponding Taiwanese Patent Application No. 097129196, mailed on Dec. 12, 2011.

* cited by examiner

*Primary Examiner* — Wen Huang
(74) *Attorney, Agent, or Firm* — Keating & Bennett, LLP

(57) ABSTRACT

In a first high frequency switch, a current path and a current path are connected in parallel. When a positive voltage is applied to a control terminal, a current flows through a path passing through (Vc2)→(DL)→(DSL1)→(DDI)→(GSL2)→(DL) and a path passing through (Vc2)→(DR)→(DD2)→(DL). In a second high frequency switch, a current path and a current path are connected in parallel. When a positive voltage is applied to a control terminal, a current flows through a first path and a second path. Thus, the transmission signal is switched with a low control voltage and deterioration of insertion loss characteristics or harmonic distortion characteristics is prevented.

8 Claims, 9 Drawing Sheets

LOW-VOLTAGE CONTROL HIGH-FREQUENCY SWITCH AND COMPOSITE HIGH-FREQUENCY COMPONENT

BACKGROUND OF THE INVENTION

1. Field of the Invention

The present invention relates to a high frequency switch and a composite high frequency component including the same. Particularly, the present invention relates to a low-voltage control high-frequency switch that switches a transmission/reception signal with a low control voltage and a composite high frequency component.

2. Description of the Related Art

High frequency switches that transmit/receive transmission/reception signals of a plurality of communication systems having different frequency bands with an antenna and switches the transmission/reception signal into transmission signals and reception signals, and composite high frequency components having the same are known.

The high frequency switch includes a plurality of diodes that output transmission signals to an antenna and input reception signals from the antenna into a receiving unit (e.g., Japanese Unexamined Patent Application Publication No. 2000-165274).

Here, the structure of a composite high frequency component described in Japanese Unexamined Patent Application Publication No. 2000-165274 is described with reference to FIG. 1.

The composite high frequency component is applied to GSM1800 (DCS) of an 1800 MHz band, GSM1900 (PCS) of a 1900 MHz band, GSM850 of an 850 MHz band, and GSM900 (EGSM) of a 900 MHz band.

In FIG. 1, a diplexer (multiplexer/demultiplexer) 102 multiplexes and demultiplexes a transmission/reception signal of a GSM850/GSM900 system and a transmission/reception signal of a GSM1800/GSM1900 system. A transmission/reception selector switch 103 switches the transmission signal and the reception signal of the GSM850/GSM900 system. Similarly, a transmission/reception selector switch 104 switches the transmission signal and the reception signal of the GSM1800/GSM1900 system. A filter 105 allows the fundamental harmonic of the transmission signals of the GSM850/GSM900 system to pass therethrough to attenuate the harmonics. Similarly, a filter 106 allows the fundamental harmonic of the transmission signal of the GSM1800/GSM1900 system to pass therethrough to attenuate the harmonics thereof.

In the transmission/reception selector switch 103, a diode GD1 and an inductor GSL1 are disposed on a transmission line through which the transmission signal of GSM850/900 is transmitted and the diode GD1 is disposed in series on the transmission line of the transmission signal. On a transmission line through which the reception signal of GSM850/900 is transmitted, a strip line GSL2, a diode GD2, and a capacitor GC5 are disposed, and the diode GD2 is disposed in shunt to the transmission line of the reception signal. The two diodes GD1 and GD2 are connected in series so that a direct current flows into the two diodes GD1 and GD2 when a positive voltage is applied from a terminal VcG for a transmission/receiving selection control signal.

Similarly, in a transmission/reception selector switch 104, a diode DD1 and an inductor DPSL1 are disposed on a transmission line through which the transmission signal of GSM1800/1900 is transmitted and the diode DD1 is disposed in series to the transmission line of the transmission signal. On a transmission line through which the reception signal of GSM1800/1900 is transmitted, a strip line DSL2, a diode DD2, and a capacitor DC5 are disposed and the diode DD2 is disposed in shunt to the transmission line of the reception signal. The two diodes GD1 and GD2 are connected in series so that a direct current flows into the two diodes DD1 and DD2 when a positive voltage is applied from a terminal VcD for a transmission/receiving selection control signal.

The composite high frequency component is used for a communication device in a mobile communication system, such as a cellular phone terminal. With a recent demand for reduction in power consumption, a driving voltage is also increasingly reduced. However, when the voltage of a control signal of a transmission/reception selector switch (high frequency switch) as illustrated in FIG. 1 is reduced, a voltage applied between an anode and a cathode of the two diodes (e.g., diodes GD1 and GD2 in the transmission/reception selector switch 103 for GSM850/900 illustrated in FIG. 1) is close to a PN junction potential of the diodes. Under such conditions, the diodes are not in a perfect-conducting state, and a phenomenon such that the ON-resistance increases or a voltage across the diode fluctuates depending on a voltage of a transmission signal to be transmitted/blocked arises. Therefore, problems arise with circuit characteristics such that insertion loss (IL) deteriorates and harmonic distortion increases. Therefore, there is a limitation on the amount that a control voltage can be reduced.

The above-described problems similarly arise in, for example, a reception signal selector switch that switches reception signals of two communication systems having mutually different frequency bands, and not only in the transmission/reception selector switch.

SUMMARY OF THE INVENTION

To overcome the problems described above, preferred embodiments of the invention provide a low-voltage control high-frequency switch that allows switching at a lower control voltage than that of a known high frequency switch and prevents deterioration of insertion loss characteristics or harmonic distortion characteristics and a composite high frequency component including the same.

A high frequency switch according to a preferred embodiment of the present invention includes a first signal input/output portion that inputs transmission signals of a plurality of communication systems having different frequency bands or outputting reception signals thereof, second and third signal input/output portions that output reception signals of at least two communication systems of the plurality of communication systems or input transmission signals thereof, a shared signal input/output portion for the plurality of communication systems, a second high frequency switch that switches between reception signals or transmission signals to the second and third signal input/output portions, and a first high frequency switch that switches between reception signals or transmission signals from the shared signal input/output portion to the first signal input/output portion or reception signals or between transmission signals from the second high frequency switch to the shared signal input/output portion.

The high frequency switch further includes a first signal transmission line between the shared signal input/output portion and the first signal input/output portion, a second signal transmission line between the shared signal input/output portion and the second high frequency switch, a third signal transmission line between the shared signal input/output portion of the second high frequency switch and the second signal input/output portion, and a fourth signal transmission line between the shared signal input/output portion of the second high frequency switch and the third signal input/output portion.

The first high frequency switch includes a first current path through which a direct current passes and which includes a first diode and a second current path through which a direct current passes and which includes a second diode. The second high frequency switch includes a third current path through which a direct current passes and which includes a third diode and a fourth current path through which a direct current passes and which includes a fourth diode. The first diode is disposed in series on the first signal transmission line, the second diode is disposed in shunt on the second signal transmission line, the first and second current paths define a first parallel connection circuit, and one junction point of the first parallel connection circuit is used as a first control voltage input portion. The third diode is disposed in series on the third signal transmission line, the fourth diode is disposed in shunt on the fourth signal transmission line, the third and fourth current paths define a second parallel connection circuit, and one junction point of the second parallel connection circuit is used as a second control voltage input portion. A shared inductor through which the direct currents passing through the first to fourth current paths pass in common is disposed between the other junction points of the first and second parallel connection circuits and ground.

The energizing direction of the direct current flowing into the shared inductor through the first and second current paths and the energizing direction of the direct current flowing into the shared inductor through the third and fourth current paths are preferably the same.

The structure described above allows the application of a control voltage to each of the first and second diodes and each of the third and fourth diodes, thereby enabling on-off control with a low control voltage. More specifically, a voltage applied to each diode increases, as compared to when two diodes are connected in series, and then a control voltage is applied thereto as in a conventional case. Therefore, a control voltage can be reduced without deteriorating the insertion loss and the harmonic distortion.

For the inductor through which the direct currents passing through the first to fourth current paths pass in common, only a single common inductor is required. Moreover, it is not necessary to insert a capacitor between the first switch and the second switch. Therefore, the total number of components is reduced to thereby reduce the size and cost of a module. Furthermore, since the elements are eliminated, the insertion loss characteristics of the second and third signal input/output portions are improved.

The energizing direction of the direct current flowing into the shared inductor through the first and second current paths and the energizing direction of the direct current flowing into the shared inductor through the third and fourth current paths are preferably the same. Thus, when a transmission signal is input or a reception signal is output through the first input/output portion, a forward bias is applied to the first and second diodes and simultaneously a reverse bias is applied to the third and fourth diodes. Thus, the applied voltage to the diodes becomes high and both of the diodes operate in a linear region. Therefore, the harmonic distortion characteristics are improved.

One of the shared inductors is preferably located on the fourth signal transmission line, for example. Thus, the insertion loss characteristics to a signal transmitting through the third signal transmission line are improved.

Another one of the shared inductors is preferably located on the shared signal input/output portion of the first high frequency switch circuit, for example. Thus, electrostatic discharge damage to the elements connected to the first to third signal input/output portions is effectively prevented.

One of the shared inductors is preferably defined by a transmission line, and the length of the transmission line is preferably adjusted to a length approximately ¼ shorter than a wavelength corresponding to a middle frequency of the reception signal output to the second signal input/output portion and the reception signal output to the third signal input/output portion.

Thus, the damping characteristics of the secondary harmonics of the reception signals output to the second signal input portion and the third signal input/output portion are improved.

A composite high frequency component according to another preferred embodiment of the present invention includes a multiplexer/demultiplexer including input/output portions of transmission/reception signals of a plurality of communication systems each having a different frequency band and an antenna connection portion and multiplexing/demultiplexing the transmission/reception signals of the plurality of communication systems, and high frequency switches that switch between transmission signals and reception signals and that are connected between the input/output portions of the transmission/reception signals of the plurality of communication systems and the multiplexer/demultiplexer, in which at least one of the plurality of high frequency switches is defined by the low-voltage control high-frequency switch according to a preferred embodiment of the present invention.

Due to the structure, a composite high frequency component of low voltage and low consumption current provided with a multiplexer/demultiplexer is obtained.

The multiplexer/demultiplexer multiplexes/demultiplexes transmission/reception signals of two communication systems whose frequency bands are close to each other among at least three communication systems and transmission/reception signals of other communication systems. The high frequency switch defined by the low-voltage control high-frequency switch is a high frequency switch at a side of switching between the transmission/reception signals of the two communication systems whose frequency bands are close to each other.

Thus, multiplexer/demultiplexer can be used as a switchplexer for a triple band that inputs/outputs transmission/reception signals of three frequency bands and outputs reception signals of two frequency bands.

The multiplexer/demultiplexer multiplexes/demultiplexes transmission/reception signals of two communication systems defining a first group in which the frequency bands are close to each other and transmission/reception signals of two communication systems constituting a second group in which the frequency bands are close to each other, among transmission/reception signals of four communication systems and the high frequency switch constituted by the low-voltage control high-frequency switch is a high frequency switch at a side of switching between transmission/reception signals of at least one of a first reception signal switch that switches between reception signals of the two communication systems defining the first group and a second reception signal switch that switches between reception signals of the two communication systems defining the second group.

Thus, multiplexer/demultiplexer can be used as a switchplexer for a quad band that input transmission signals of four communication systems and output reception signals thereof.

A portion of a circuit of the composite high frequency component is preferably provided on a multilayer ceramic substrate. Thus, a one-chip structure can be provided, and thus loss due to wiring between components can be prevented.

According to preferred embodiments of the present invention, on-off control with a low control voltage can be achieved, and the control voltage can be reduced without deteriorating insertion loss and harmonic distortion.

Moreover, the total number of components is reduced to thereby reduce the size and cost of a module. Furthermore, since the elements are eliminated, insertion loss characteristics are further improved.

When a transmission signal is input through the first input/output portion, a forward bias is applied to the first and second diodes and simultaneously a reverse bias is applied to the third and fourth diodes. Thus, the applied voltage to the diodes becomes high and both of the diodes operate in a linear region. Therefore, the harmonic distortion characteristics improve.

Other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

A composite high frequency component according to a first preferred embodiment of the present invention will be described with reference to FIG. 2.

Figure 1:
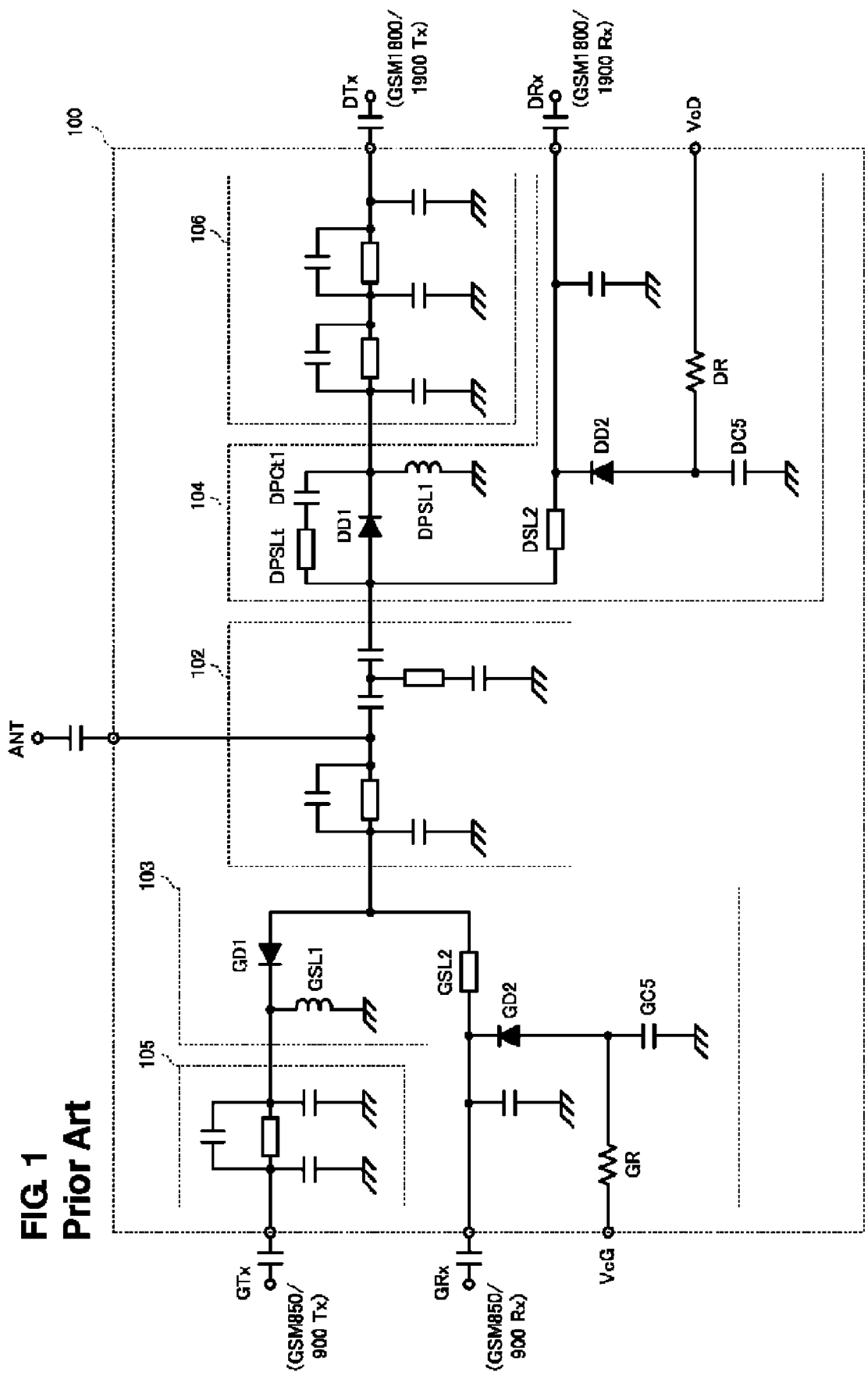
FIG. 1 is a view of the structure of a known composite high frequency component.
Figure 2:
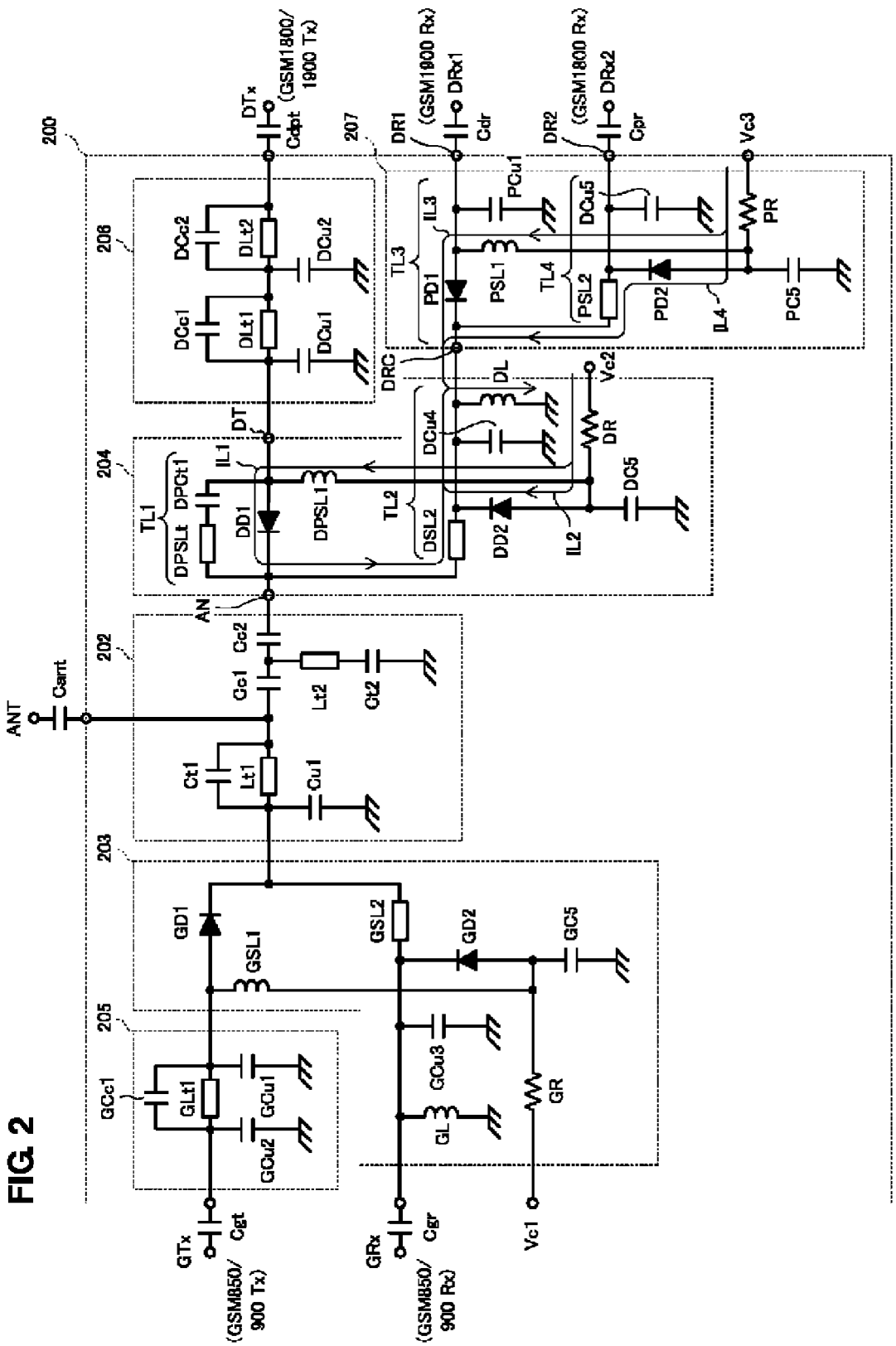
FIG. 2 is a circuit diagram of a composite high frequency component concerning according to a first preferred embodiment of the present invention.

A composite high frequency component 200 illustrated in FIG. 2 is applied to GSM1800 (DCS) of a 1800 MHz band, GSM1900 (PCS) of a 1900 MHz band, GSM850 of an 850 MHz band, and GSM900 (EGSM) of a 900 MHz band.

The composite high frequency component includes a first signal input/output portion DT that inputs transmission signals of GSM1800 and GSM1900, second and third signal input/output portions DR1 and DR2 that output reception signals of the two communication systems, and a shared signal input/output portion AN of the two communication systems. Moreover, a signal input/output portion GTx that inputs transmission signals of GSM850 and GSM900 and a signal input/output portion GRx that outputs reception signals of the two communication systems are disposed.

In FIG. 2, a diplexer 202 multiplexes or demultiplexes transmission/reception signals of a GSM850/GSM900 system and transmission/reception signals of a GSM1800/GSM1900 system. A transmission/reception selector switch 203 switches between a transmission signal and a reception signal of the GSM850/GSM900 system. A transmission/reception selector switch 204 switches between a transmission signal and a reception signal of the GSM1800/GSM1900 system. A filter 205 allows the transmission signal of the GSM850/GSM900 system to pass therethrough to attenuate the harmonics. A filter 206 allows the transmission signal of the GSM1800/GSM1900 system to pass therethrough to attenuate the harmonics thereof. A reception signal switch 207 switches the reception signal of the GSM1800/1900 system into the reception signals of GSM1800 and GSM1900.

The transmission/reception selector switch 204 corresponds to a "first high frequency switch". The reception signal switch 207 corresponds to a "second high frequency switch".

In the diplexer 202, capacitors Ct1 and Cu1 and a strip line Lt1 define a low pass filter and capacitors Cc1, Cc2, and Ct2 and a strip line Lt2 define a high pass filter.

In the filter 205, capacitors GCc1, GCu1, and GCu2, and a strip line GLt1 define a low pass filter.

In the filter 206, capacitors DCc1, DCc2, DCu1, and DCu2 and strip lines DLt1 and DLt2 define a low pass filter.

In the transmission/reception selector switch 203 for the GSM850/900 system, a first diode GD1 is disposed in series on a transmission line of the transmission signal of the GSM850/900 system and a second diode GD2 and a capacitor GC5 are disposed in shunt on a transmission line of the reception signal of the GSM850/900 system. A first current path through which a direct current flows is defined as a path passing through Control terminal Vc1→Resistance GR→Inductor GSL1→Diode GD1→Strip line GSL2→Inductor GL, a second current path through which a direct current flows is defined as a path passing through Vc1→GR→Diode GD2→GL. The first current path including the diode GD1 and the second current path including the diode GD2 are connected in parallel.

The capacitor GCu3 disposed on the reception signal transmission line for the GSM850/900 system is preferably a capacitor arranged to provide for impedance matching of the reception signal transmission line when the diode GD2 is in the OFF state.

In the transmission/reception selector switch 204 at the GSM1800/1900 side, the first diode DD1 is disposed in series on a transmission signal transmission line TL1 for the GSM1800/1900 system and the second diode DD2 is disposed in shunt on a reception signal transmission line TL2 for the GSM1800/1900 system.

The transmission signal transmission line TL1 and the reception signal transmission line TL2 define a first parallel connection circuit, and one junction point of the first parallel connection circuit is used as a first control voltage input portion (Vc2).

In contrast, in the reception signal switch 207 for the GSM1800/1900 system, the third diode PD1 is disposed in series on a reception signal transmission line TL3 for the GSM1900 system and the second diode PD2 is disposed in shunt on a reception signal transmission line TL4 for GSM1800.

The reception signal transmission line TL3 and the reception signal transmission line TL4 define a second parallel connection circuit, and one junction point of the second parallel connection circuit is used as a second control voltage input portion (Vc3).

A shared inductor DL through which direct currents passing through the transmission signal transmission line TL1, the reception signal transmission line TL2, the reception signal transmission line TL3, and the reception signal transmission line TL4 pass in common is disposed between other junction points of the first and second parallel connection circuits and ground.

The directions of the diodes DD1, DD2, PD1, and PD2 are determined so that the energizing direction of the direct current flowing into the shared inductor DL through the transmission signal transmission line TL1 and the reception signal transmission line TL2 and the energizing direction of the direct current flowing into shared inductor DL through the reception signal transmission line TL3 and the reception signal transmission line TL4 are the same. In this preferred embodiment, a cathode of DD1 is preferably located on the side of the shared signal input/output portion (AN), anodes of DD2 and PD2 are preferably located on the ground side, and a cathode of PD1 is preferably located on the side of the shared signal input/output portion (DRC) of the second high frequency switch, for example.

Here, when a given positive voltage is applied to the control terminal Vc2 of the transmission/reception selector switch 204, the first diode DD1 turn ON. Then, a direct current flows through the first current path (IL1), i.e., the path passing through Vc2→Resistance DR→Inductor DPSL1→DD1→Stripe line DSL2→Inductor DL. When the second diode DD2 turns ON, a direct current flows through the second current path (IL2), i.e., the path passing through Vc2→DR→DD2→DL. Thus, the transmission signal transmission line TL1 is rendered conducting and the reception signal transmission line TL2 is blocked.

When the applied voltage of the control terminal Vc2 of the transmission/reception selector switch 204 is 0 V or a negative voltage, both of the first diode DD1 and the second diode DD2 turn OFF. Thus, the transmission signal transmission line TL1 is blocked and the reception signal transmission line TL2 is rendered conducting.

The strip line DPSLt is arranged so as to ensure isolation using parallel resonance of the capacitance of the diode DD1 and the DPSLt when the diode DD1 is in the OFF state. The capacitor DPCt1 prevents a direct current from flowing without passing through the diode DD1.

When the diode DD2 is in the OFF state, the capacitor DCu4 is arranged to match the impedance of the reception signal transmission line.

In contrast, when a given positive voltage is applied to the control terminal Vc3 of the reception signal switch 207, the third diode PD1 turns ON. Then, a direct current flows through the third current path (IL3), i.e., the path passing through Vc3→Resistance PR→Inductor PSL1→PD1→Inductor DL. When the fourth diode PD2 turns ON, a direct current flows through the fourth current path (IL4), i.e., the path passing through Vc3→PR→PD2→PSL2→DL. Thus, the reception signal transmission line TL3 is rendered conducting and the reception signal transmission line TL4 is blocked.

When the applied voltage of the control terminal Vc3 of the reception signal switch 207 is 0 V or a negative voltage, both of the third diode PD1 and the fourth diode PD2 turn OFF. Thus, the reception signal transmission line TL3 is blocked and the reception signal transmission line TL4 is rendered conducting.

Thus, all of the switching between transmission and reception at the side of the GSM850/900 system, the switching between transmission and reception at the side of the GSM1800/1900 system, and the switching of reception signals between the GSM1900 system and the GSM1800 system can be effectively controlled with a low voltage.

For example, although a control voltage of about 2.4 V to about 2.8 V or about 2.3 V to about 3.0 V have been previously used, the control voltage can preferably be adjusted to be as low as about 1.6 V to about 2.0 V, for example, in the circuit illustrated in FIG. 2.

The voltage changes to forward bias to the first diode DD1 and the second diode DD2 and changes to reverse bias to the third diode PD1 and the fourth diode PD2 while a positive voltage is being applied to the control terminal Vc2. More specifically, even when a positive voltage is applied to the control terminal Vc2, and the control terminal Vc3 is in a grounding state, reverse bias is applied to the third and fourth diodes (PD1, PD2). Thus, the applied voltage to the third and fourth diodes (PD1, PD2) becomes high, and both of the diodes operate in a linear region, which increases harmonic distortion characteristics.

In general, when a diode is operated under forward bias, the diode operates in a nonlinear region. Therefore, harmonic distortion occurs and harmonic distortion characteristics are deteriorated. However, as described above, a diode of a reception side circuit is biased into a reverse bias at the time of turning a transmission side of the GSM1800/1900 system ON, harmonic distortion does not occur from the diodes (PD1, PD2) at the reception side, and a problem such that an unnecessary spurious response is superimposed on a transmission signal can be prevented. More specifically, since the linear region of a diode is used in the case of reverse bias, the development of harmonic distortion can be effectively prevented.

Next, a structural example when the composite high frequency component is integrated on a multilayer substrate obtained by laminating a plurality of ceramic sheet layers will be described with reference to FIGS. 3(1) to 6(26).

Figure 3:
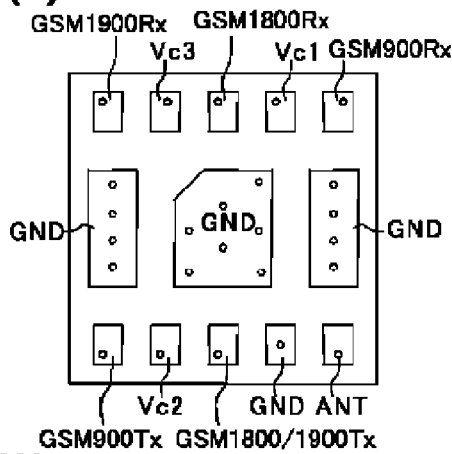
FIGS. 3(1) to 3(8) are views of a conductor pattern of each layer when the composite high frequency component is provided on a multilayer substrate in which a plurality of ceramic sheet layers are laminated.
Figure 3:
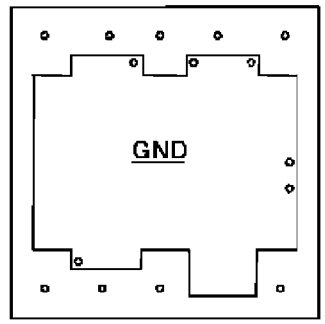
Figure 3:
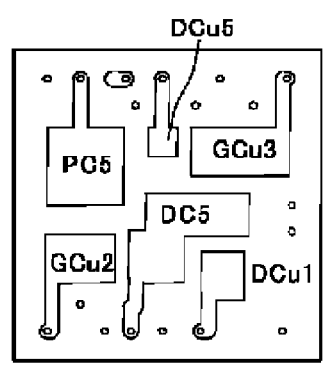
Figure 3:
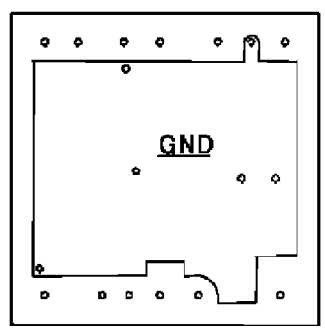
Figure 3:
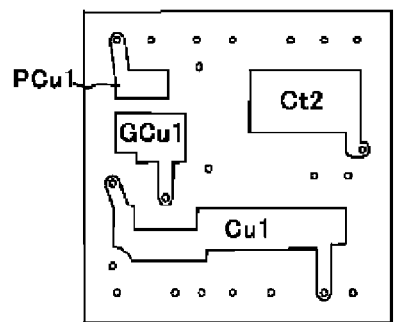
Figure 3:
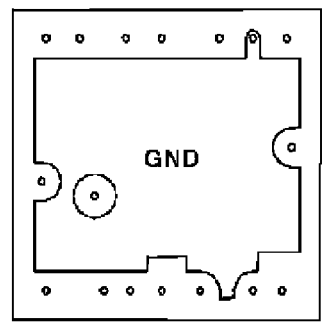
Figure 3:
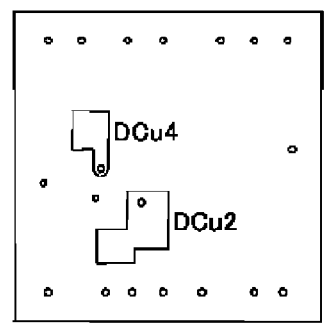
Figure 3:
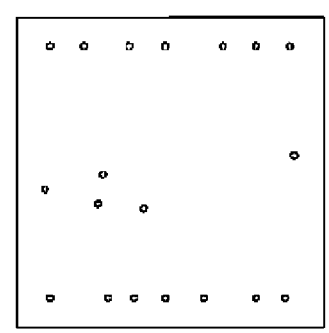
Figure 4:
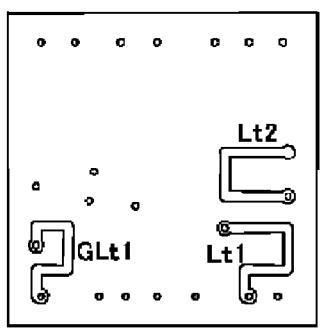
FIGS. 4(9) to 4(16) are views of a conductor pattern of each layer, continuing from FIG. 3.
Figure 4:
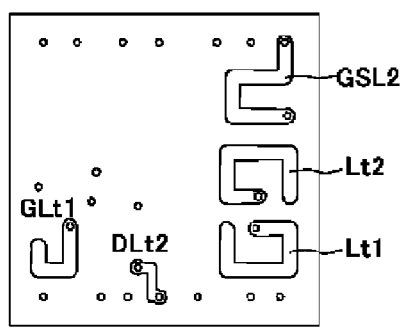
Figure 4:
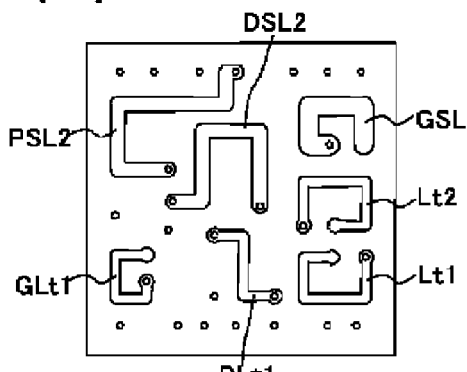
Figure 4:
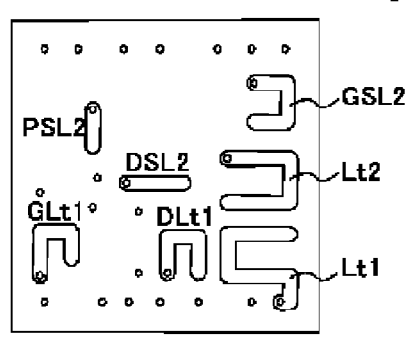
Figure 4:
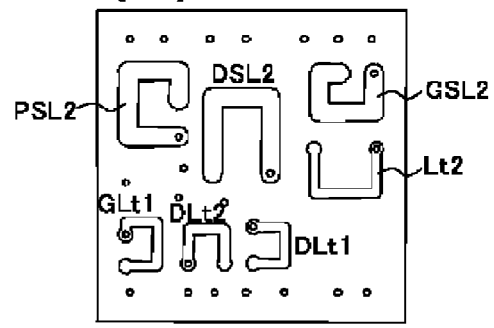
Figure 4:
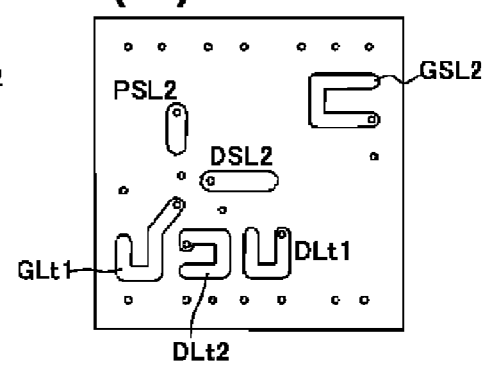
Figure 4:
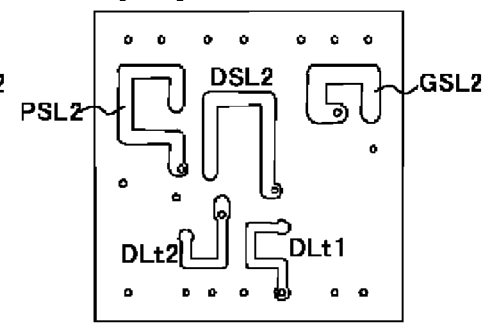
Figure 4:
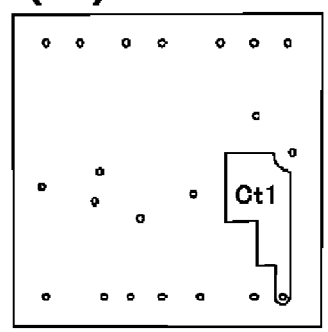
Figure 5:
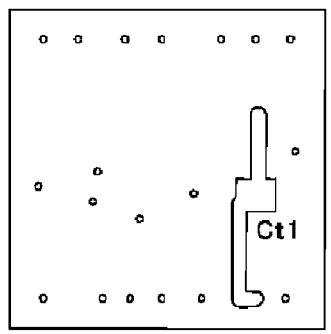
FIGS. 5(17) to 5(24) are views of a conductor pattern of each layer, continuing from FIG. 4.
Figure 5:
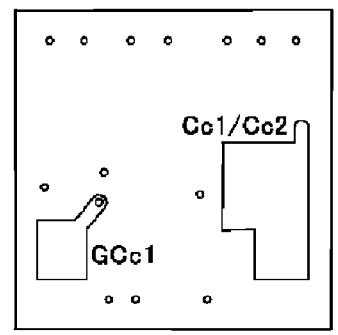
Figure 5:
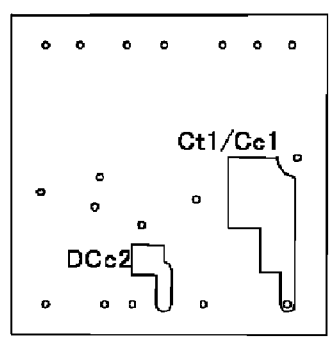
Figure 5:
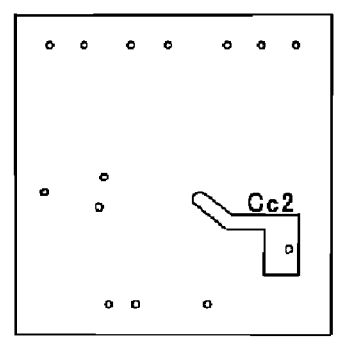
Figure 5:
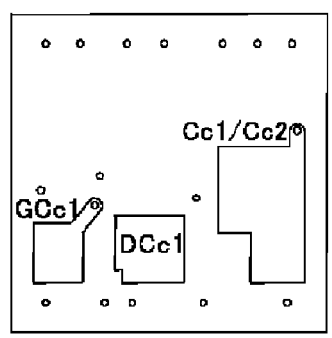
Figure 5:
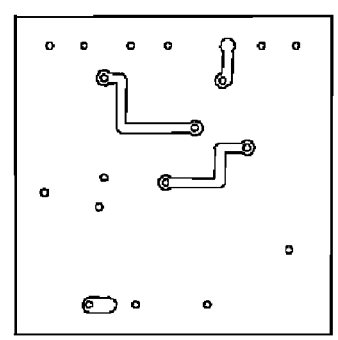
Figure 5:
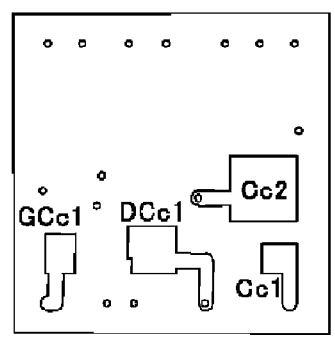
Figure 5:
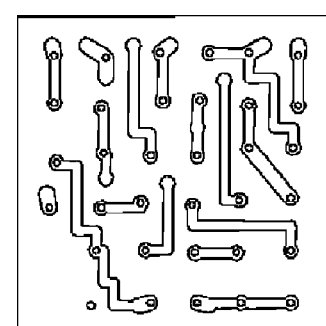
Figure 6:
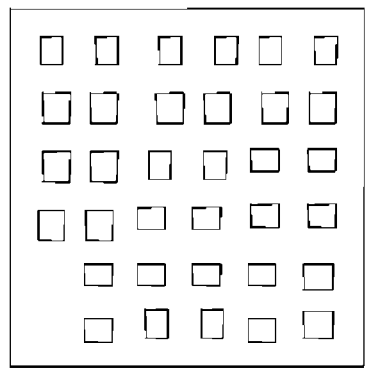
FIG. 6(25) is a view of a conductor pattern a layer, continuing from FIG. 5 and FIG. 6(26) is a view of the structure of the top layer of a laminate of the composite high frequency component.
Figure 6:
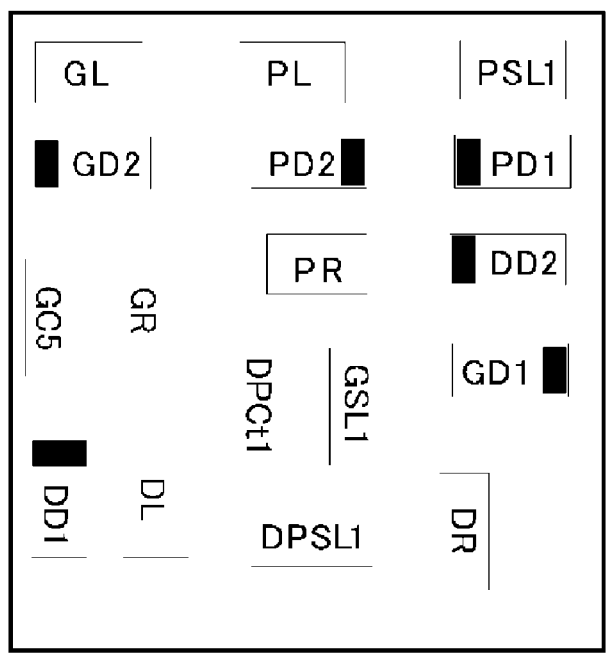

FIGS. 3(1) to 6(26) are bottom views of a conductor pattern of each layer. For convenience of illustration, the conductor pattern is separately illustrated in FIGS. 3(1) to 6(36). FIG. 3(1) illustrates the bottom layer and FIG. 6(25) illustrates the top layer. FIG. 6(26) is an enlarged top view in a state in which each chip is mounted on the top surface of the laminate. Each reference character of each portion in FIGS. 3 to 6 corresponds to each reference character in the circuit diagram illustrating in FIG. 2. GND in the figures refers to a grounding electrode (a grounding terminal in FIG. 3(1)). Other terminals correspond to the respective reference characters in the circuit diagram illustrated in FIG. 2.

In this preferred embodiment, a surface mounting component is used as the shared inductor DL as illustrated in FIG. 6(26), and is mounted on one principal surface on the multilayer substrate. As another example, a wiring board on which the shared inductor DL is arranged inside the multilayer substrate may be used. When the shared inductor DL is not located immediately above a portion in which a propagation circuit (transmission circuit) of a transmission signal of GSM1800/1900 is formed as in this preferred embodiment, electrical connection between the transmission circuit and the shared inductor DL can be prevented, thereby increasing the isolation of the transmission circuit and the receiving circuit.

As described above, with the composite high frequency component according to the first preferred embodiment, a reduction in voltage and a reduction in power consumption can be achieved. Moreover, the overall module size can be reduced. Furthermore, the insertion loss characteristics of the reception signals of GSM1800 and GSM1900 and the harmonic distortion characteristics of the transmission signal of the GSM1800/GSM1900 system can be improved.

Second Preferred Embodiment

Figure 7:
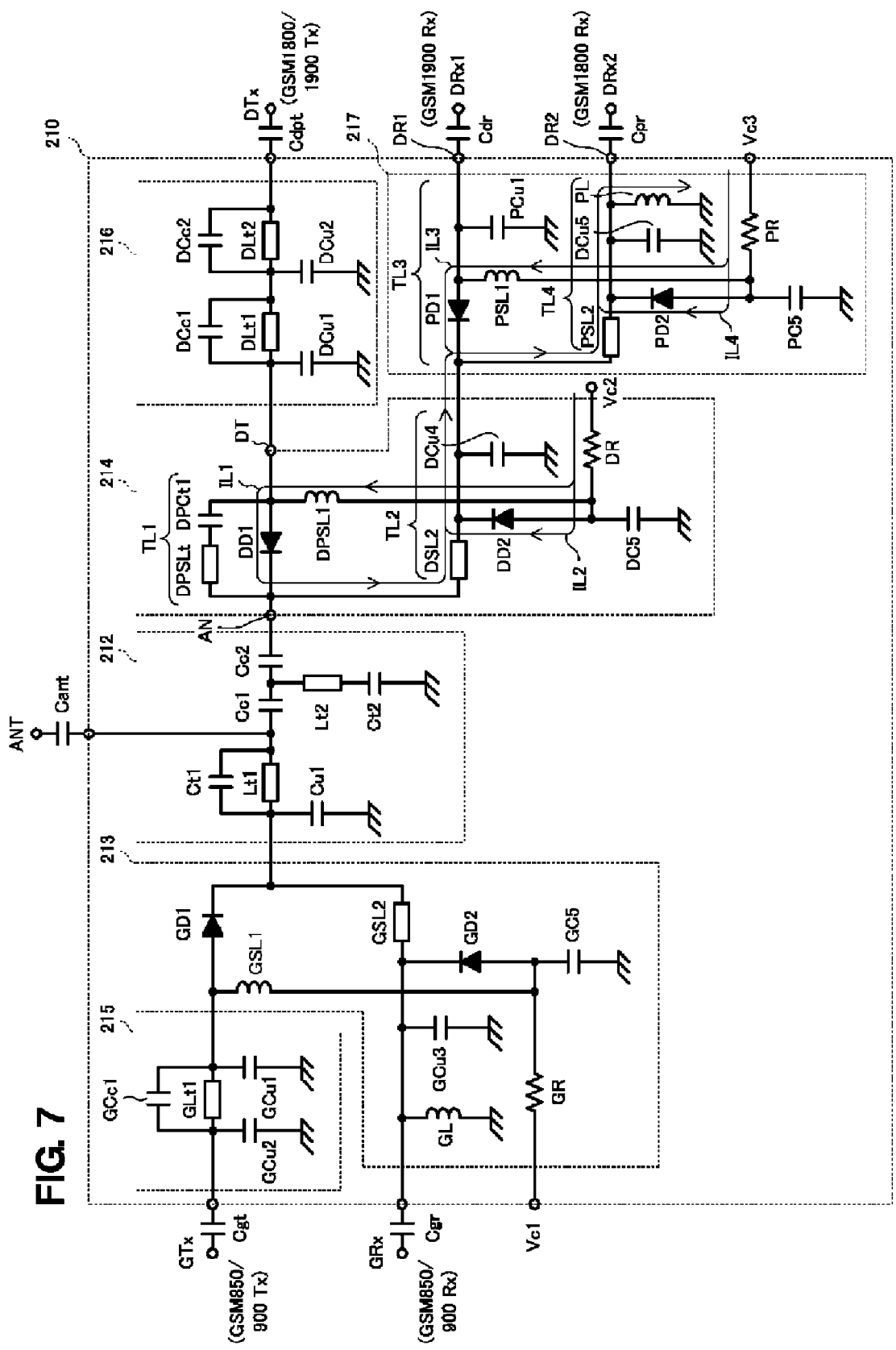
FIG. 7 is a circuit diagram of a composite high frequency component according to a second preferred embodiment of the present invention.

Next, the composite high frequency component according to a second preferred embodiment of the present invention will be described with reference to FIG. 7.

A composite high frequency component 210 is different from the composite high frequency component illustrated in FIG. 2 in the configurations of a transmission/reception selector switch 214 and a reception signal switch 217. The remaining structure is the same or substantially the same as in the composite high frequency component illustrated in FIG. 2.

In the transmission/reception selector switch 214 at the side of GSM1800/1900, the first diode DD1 is disposed in series on the transmission signal transmission line TL1 for GSM1800/1900. The second diode DD2 is disposed in shunt on the reception signal transmission line TL2 for GSM1800/1900.

The transmission signal transmission line TL1 and the reception signal transmission line TL2 define the first parallel connection circuit, and one junction point of the first parallel connection circuit is used as the first control voltage input portion (Vc2).

In contrast, in the switch 217 for the reception signal of GSM1800/1900, the third diode PD1 is disposed in series on the reception signal transmission line TL3 for GSM1900 and the second diode PD2 is disposed in shunt on the reception signal transmission line TL4 for GSM1800.

The reception signal transmission line TL3 and the reception signal transmission line TL4 define the second parallel connection circuit and one junction point of the second parallel connection circuit is used as the second control voltage input portion (Vc3).

A shared inductor PL through which direct currents passing through the transmission signal transmission line TL1, the reception signal transmission line TL2, the reception signal transmission line TL3, and the reception signal transmission line TL4 pass in common is disposed between other junction points of the first and second parallel connection circuits and ground.

The directions of the diodes DD1, DD2, PD1, and PD2 are determined so that the energizing direction of the direct current flowing into the shared inductor PL through the transmission signal transmission line TL1 and the reception signal transmission line TL2 and the energizing direction of the direct current flowing into the shared inductor PL through the reception signal transmission line TL3 and the reception signal transmission line TL4 are the same.

Here, when a given positive voltage is applied to the control terminal Vc2 of the transmission/reception selector switch 214, the first diode DD1 turns ON. Then, a direct current flows through the first current path (IL1), i.e., the path passing through Vc2→Resistance DR→Inductor DPSL1→DD1→Stripe line DSL2→Inductor PL. When the second diode DD2 turns ON, a direct current flows through the second current path (IL2), i.e., the path passing through Vc2→DR→DD2→PSL2→PL. Thus, the transmission signal transmission line TL1 is rendered conducting and the reception signal transmission line TL2 is blocked.

When the applied voltage of the control terminal Vc2 of the transmission/reception selector switch 214 is 0 V or a negative voltage, both of the first diode DD1 and the second diode DD2 turn OFF. Thus, the transmission signal transmission line TL1 is blocked and the reception signal transmission line TL2 is rendered conducting.

In contrast, when a given positive voltage is applied to the control terminal Vc3 of the reception signal switch 217, the third diode PD1 turns ON. Then, a direct current flows through the third current path (IL3), i.e., the path passing through Vc3→Resistance PR→Inductor PSL1→PD1→Strip line PSL2→Inductor PL. When the fourth diode PD2 turns ON, a direct current flows through the fourth current path (IL4), i.e., the path passing through Vc3→PR→PD2→PL. Thus, the reception signal transmission line TL3 is rendered conducting and the reception signal transmission line TL4 is blocked.

When the applied voltage of the control terminal Vc3 of the reception signal switch 207 is 0 V or a negative voltage, both of the third diode PD1 and the fourth diode PD2 turn OFF. Thus, the reception signal transmission line TL3 is blocked and the reception signal transmission line TL4 is rendered conducting.

Thus, all of the switching between transmission and reception at the side of GSM850/900, the switching between transmission and reception at the side of GSM1800/1900, and the switching of reception signals between GSM1900 and GSM1800 can be effectively controlled with a low voltage.

Similar to the first preferred embodiment, the overall module size can be reduced, and the insertion loss characteristics of the reception signals of GSM1800 and GSM1900 and the harmonic distortion characteristics of the transmission signal of the GSM1800/GSM1900 system can be improved.

Third Preferred Embodiment

Figure 8:
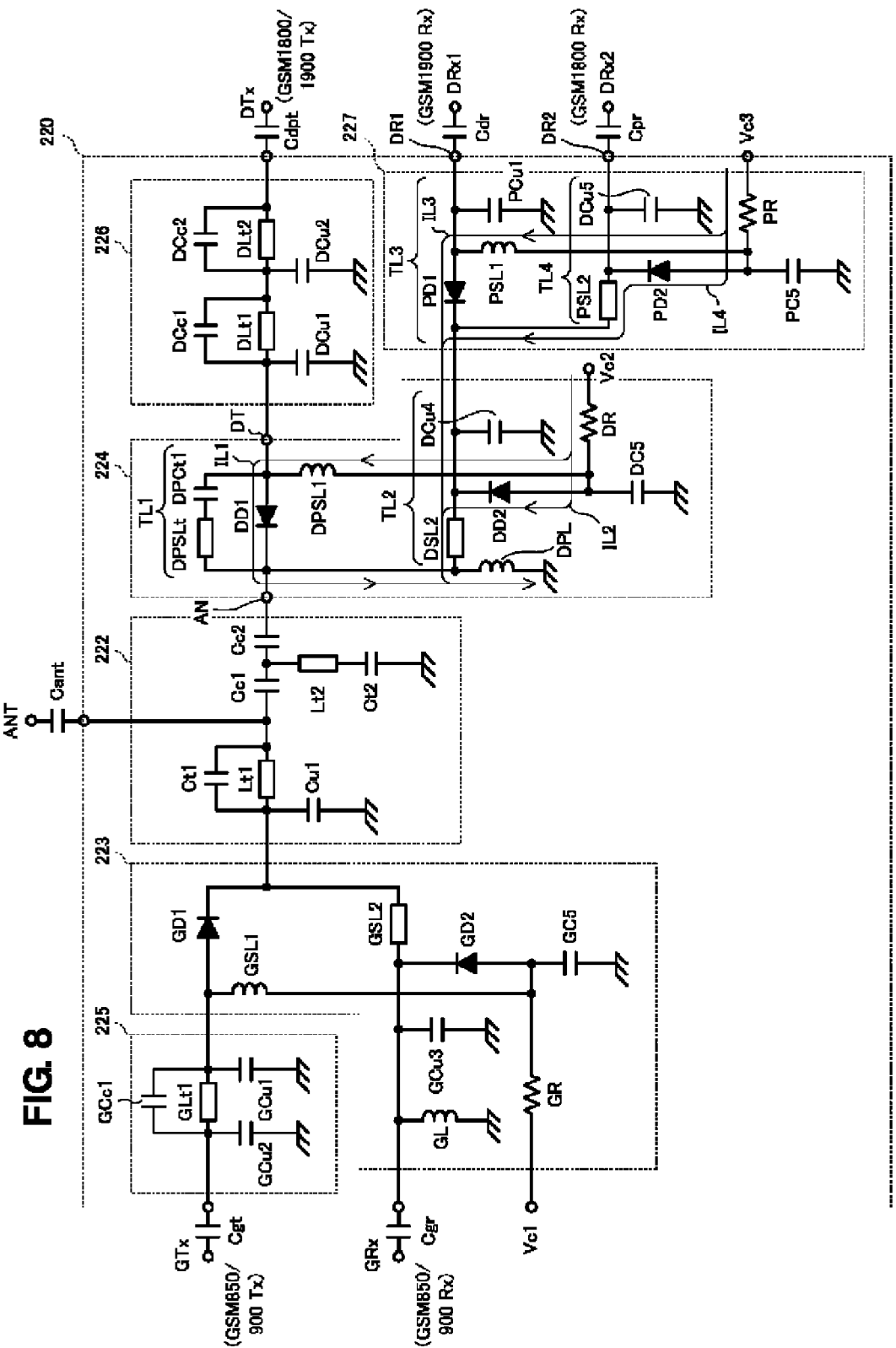
FIG. 8 is a circuit diagram of a composite high frequency component according to a third preferred embodiment of the present invention.

Next, a composite high frequency component according to a third preferred embodiment of the present invention will be described with reference to FIG. 8.

A composite high frequency component 220 is different from the high frequency component illustrated in FIG. 2 in the configuration of a transmission/reception selector switch 224 and a reception signal switch 227. The remaining structure is the same and substantially the same as the composite high frequency component illustrated in FIG. 2.

In the transmission/reception selector switch 224 at the side of GSM1800/1900, the first diode DD1 is disposed in series on the transmission signal transmission line TL1 of GSM1800/1900. The second diode DD2 is disposed in shunt on the reception signal transmission line TL2 of GSM1800/1900.

The transmission signal transmission line TL1 and the reception signal transmission line TL2 define the first parallel connection circuit, and one junction point of the first parallel connection circuit is used as the first control voltage input portion (Vc2).

In contrast, in the switch 227 for the reception signal of GSM1800/1900, the third diode PD1 is disposed in series on the reception signal transmission line TL3 for GSM1900 and the second diode PD2 is disposed in shunt on the reception signal transmission line TL4 for GSM1800.

The reception signal transmission line TL3 and the reception signal transmission line TL4 define the second parallel connection circuit and one junction point of the second parallel connection circuit is used as the second control voltage input portion (Vc3).

A shared inductor PL through which direct currents passing through the transmission signal transmission line TL1, the reception signal transmission line TL2, the reception signal transmission line TL3, and the reception signal transmission line TL4 pass in common is disposed between other junction points of the first and second parallel connection circuits and grounding.

The directions of the diodes DD1, DD2, PD1, and PD2 are determined so that the energizing direction of the direct current flowing into the shared inductor DPL through the transmission signal transmission line TL1 and the reception signal transmission line TL2 and the energizing direction of the direct current flowing into the shared inductor DPL through the reception signal transmission line TL3 and the reception signal transmission line TL4 are the same.

Here, when a given positive voltage is applied to the control terminal Vc2 of the transmission/reception selector switch 224, the first diode DD1 turns ON. Then, a direct current flows through the first current path (IL1), i.e., the path passing through Vc2→Resistance DR→Inductor DPSL1→DD1→Inductor DPL. When the second diode DD2 turns ON, a direct current flows through the second current path (IL2), i.e., the path passing through Vc2→DR→DD2→Strip line DSL2→DPL. Thus, the transmission signal transmission line TL1 is rendered conducting and the reception signal transmission line TL2 is blocked.

When the applied voltage of the control terminal Vc2 of the transmission/reception selector switch 224 is 0 V or a negative voltage, both the first diode DD1 and the second diode DD2 turn OFF. Thus, the transmission signal transmission line TL1 is blocked and the reception signal transmission line TL2 is rendered conducting.

In contrast, when a given positive voltage is applied to the control terminal Vc3 of the reception signal switch 227, the third diode PD1 turns ON. Then, a direct current flows through the third current path (IL3), i.e., the path passing through Vc3→Resistance PR→Inductor PSL1→PD1→Strip line DSL2→Inductor DPL. When the fourth diode PD2 turns ON, a direct current flows through the fourth current path (IL4), i.e., the path passing through Vc3→PR→PD2→Strip line PSL2→DSL2→DPL. Thus, the reception signal transmission line TL3 is rendered conducting and the reception signal transmission line TL4 is blocked.

When the applied voltage of the control terminal Vc3 of the reception signal switch 227 is 0 V or a negative voltage, both the third diode PD1 and the fourth diode PD2 turn OFF. Thus, the reception signal transmission line TL3 is blocked and the reception signal transmission line TL4 is rendered conducting.

Thus, all of the switching between transmission and reception at the side of GSM850/900, the switching between transmission and reception at the side of GSM1800/1900, and the switching of reception signals between GSM1900 and GSM1800 can be effectively controlled with a low voltage.

Similar to the first preferred embodiment, the overall module size can be reduced, and the insertion loss characteristics of the reception signals of GSM1800 and GSM1900 and the harmonic distortion characteristics of the transmission signal of the GSM1800/GSM1900 system can be improved.

Fourth Preferred Embodiment

Figure 9:
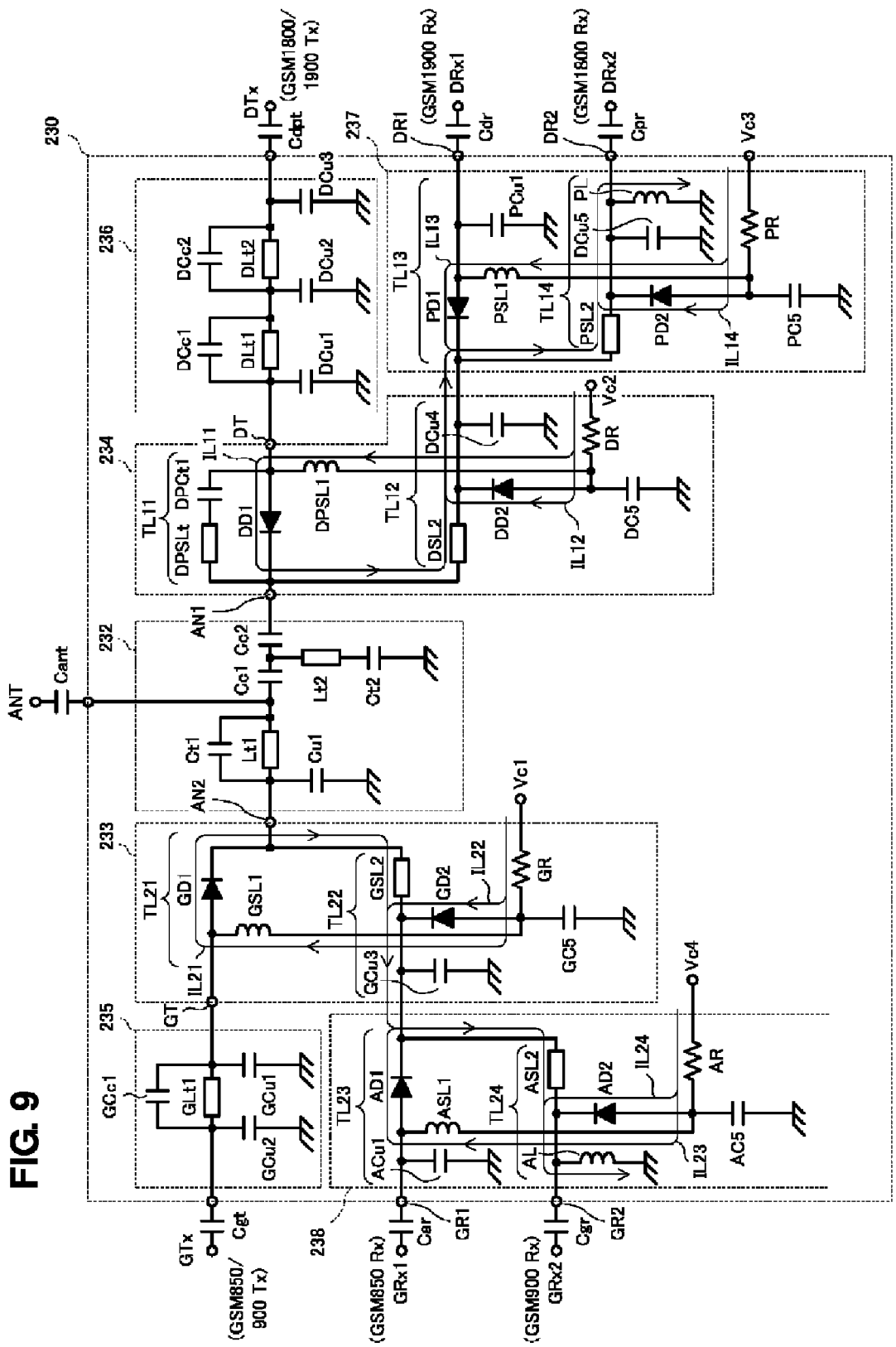
FIG. 9 is a circuit diagram of a composite high frequency component according to a fourth preferred embodiment of the present invention.

Next, a composite high frequency component according to a fourth preferred embodiment will be described with reference to FIG. 9.

A composite high frequency component 230 is used as a quad-band switchplexer by also providing a reception signal switch 238 also at the GSM850/900 side. The remaining structure is the same or substantially the same as the composite high frequency component illustrated in FIG. 7.

In a transmission/reception selector switch 233 at the side of GSM850/900, a first diode GD1 is disposed in series on a transmission signal transmission line TL21 for GSM850/900. A second diode GD2 is disposed in shunt on the reception signal transmission line TL22 for GSM850/900.

The transmission signal transmission line TL21 and the reception signal transmission line TL22 define the first parallel connection circuit, and one junction point of the first parallel connection circuit is used as a first control voltage input portion (Vc1).

In contrast, in a switch 228 for the reception signal of GSM850/900, a third diode AD1 is disposed in series on a reception signal transmission line TL23 for GSM850 and a second diode AD2 is disposed in shunt on a reception signal transmission line TL24 for GSM900.

The reception signal transmission line TL23 and the reception signal transmission line TL24 define the second parallel connection circuit and one junction point of the second parallel connection circuit is used as a second control voltage input portion (Vc4).

A shared inductor AL through which direct currents passing through the transmission signal transmission line TL21, the reception signal transmission line TL22, the reception signal transmission line TL23, and the reception signal transmission line TL24 pass in common is disposed between other junction points of the first and second parallel connection circuits and grounding.

The directions of the diodes GD1, GD2, AD1, and AD2 are determined so that the energizing direction of the direct current flowing into the shared inductor AL through the transmission signal transmission line TL21 and the reception signal transmission line TL22 and the energizing direction of the direct current flowing into the shared inductor AL through the reception signal transmission line TL23 and the reception signal transmission line TL24 are the same.

Here, when a given positive voltage is applied to the control terminal Vc1 of the transmission/reception selector switch 233, the first diode GD1 turns ON. Then, a direct current flows through the first current path (IL21), i.e., the path passing through Vc1→Resistance GR→Inductor GSL1→GDI→Strip line GSL2→Strip line ASL2→Inductor AL. When the second diode GD2 turns ON, a direct current flows through the second current path (IL22), i.e., the path passing through Vc1→GR→GD2→ADSL2→AL. Thus, the transmission signal transmission line TL21 is rendered conducting and the reception signal transmission line TL22 is blocked.

When the applied voltage of the control terminal Vc1 of the transmission/reception selector switch 233 is 0 V or a negative voltage, both the first diode GD1 and the second diode GD2 turn OFF. Thus, the transmission signal transmission line TL21 is blocked and the reception signal transmission line TL22 is rendered conducting.

In contrast, when a given positive voltage is applied to the control terminal Vc4 of the reception signal switch 238, the third diode AD1 turns ON. Then, a direct current flows through the third current path (IL23), i.e., the path passing through Vc4→Resistance AR→Inductor ASL1→AD1→Strip line ASL2→Inductor AL. When the fourth diode AD2 turns ON, a direct current flows through the fourth current path (IL24), i.e., the path passing through Vc4→AR→AD2→AL. Thus, the reception signal transmission line TL23 is rendered conducting and the reception signal transmission line TL24 is blocked.

When the applied voltage of the control terminal Vc4 of the reception signal switch 238 is 0 V or a negative voltage, both the third diode AD1 and the fourth diode AD2 turn OFF. Thus, the reception signal transmission line TL23 is blocked and the reception signal transmission line TL24 is rendered conducting.

Thus, all of the switching between transmission and reception at the GSM850/900 side, the switching of reception signals between GSM850 and GSM900, the switching between transmission and reception at the GSM850/900 side, and the switching of reception signals between GSM1900 and GSM1800 can be effectively controlled with a low voltage.

The overall module size can be reduced, and the insertion loss characteristics of the reception signals of GSM1800 and GSM1900 and the insertion loss characteristics of the reception signals of GSM850 and GSM900 can be improved. Moreover, the harmonic distortion characteristics of the transmission signal of the GSM850/GSM900 system and the harmonic distortion characteristics of the transmission signal of the GSM1800/GSM1900 system can be improved.

In each of the preferred embodiments described above, an example in which the first signal input/output portion DT that inputs the transmission signals of GSM1800 and GSM1900 and the second and third signal input/output portions DR1 and DR2 that output the reception signals of the two communication systems is described. However, the input and output may be reversed. More specifically, a high frequency switch can also be used so that the reception signal is output from the first signal input/output portion and the transmission signal is input into the second and third signal input/output portions, and thus the same effects are achieved.

In the second to fourth preferred embodiments, the composite high frequency component is preferably provided on a multilayer substrate obtained by laminating a plurality of ceramic sheet layers similarly to the first preferred embodiment in order to facilitate miniaturization.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A low-voltage control high-frequency switch, comprising:
a first signal input/output portion arranged to input transmission signals of a plurality of communication systems having different frequency bands or to output reception signals thereof;
second and third signal input/output portions arranged to output reception signals of at least two communication systems of the plurality of communication systems or input transmission signals thereof;
a shared signal input/output portion for the plurality of communication systems;
a second high frequency switch arranged to switch between reception signals or transmission signals to or from the second and third signal input/output portions; and
a first high frequency switch arranged to switch between reception signals or transmission signals from the shared signal input/output portion to the first signal input/output portion or between reception signals or transmission signals from the second high frequency switch to the shared signal input/output portion; wherein
the low-voltage control high-frequency switch includes a first signal transmission line located between the shared signal input/output portion and the first signal input/output portion, a second signal transmission line located between the shared signal input/output portion and the second high frequency switch, a third signal transmission line located between the shared signal input/output portion for the second high frequency switch and the second signal input/output portion, and a fourth signal transmission line between the shared signal input/output portion for the second high frequency switch and the third signal input/output portion;
the first high frequency switch includes a first current path through which a direct current passes and which includes a first diode and a second current path through which a direct current passes and which includes a second diode;
the second high frequency switch includes a third current path through which a direct current passes and which includes a third diode and a fourth current path through which a direct current passes and which includes a fourth diode;
the first diode is disposed in series on the first signal transmission line, the second diode is disposed in shunt on the second signal transmission line, the first and second current paths define a first parallel connection circuit, and one junction point of the first parallel connection circuit defines a first control voltage input portion;
the third diode is disposed in series on the third signal transmission line, the fourth diode is disposed in shunt on the fourth signal transmission line, the third and fourth current paths define a second parallel connection circuit, and one junction point of the second parallel connection circuit defines a second control voltage input portion;
a shared inductor through which the direct currents passing through the first to fourth current paths pass in common is disposed between the other junction points of the first and second parallel connection circuits and ground; and
an energizing direction of the direct current flowing into the shared inductor through the first and second current paths and an energizing direction of the direct current flowing into the shared inductor through the third and fourth current paths are the same.

2. The low-voltage control high-frequency switch according to claim 1, wherein the shared inductor is disposed on the fourth signal transmission line.

3. The low-voltage control high-frequency switch according to claim 1, wherein the shared inductor is disposed on the shared signal input/output portion of the first high frequency switch circuit.

4. The low-voltage control high-frequency switch according to claim 3, wherein the shared inductor is defined by a transmission line, and a length of the transmission line is adjusted to a length approximately ¼ shorter than a wavelength corresponding to a middle frequency of the reception signal output to the second signal input/output portion and the reception signal output to the third signal input/output portion.

5. A composite high frequency component, comprising:
a multiplexer/demultiplexer including input/output portions of transmission/reception signals of a plurality of communication systems each having a different frequency band and an antenna connection portion and arranged to multiplex/demultiplex the transmission/reception signals of the plurality of communication systems; and high frequency switches arranged to switch between transmission signals and reception signals and being connected between the input/output portions of the transmission/reception signals of the plurality of communication systems and the multiplexer/demultiplexer; wherein at least one of the plurality of high frequency switches is defined by the low-voltage control high-frequency switch according to claim 1.

6. The composite high frequency component according to claim 5, wherein the multiplexer/demultiplexer is arranged to multiplex/demultiplex transmission/reception signals of two communication systems whose frequency bands are close to each other among at least three communication systems and transmission/reception signals of other communication systems; and the high frequency switch defined by the low-voltage control high-frequency switch is a high frequency switch at a side of switching between the transmission/reception signals of the two communication systems whose frequency bands are close to each other.

7. The composite high frequency component according to claim 5, wherein the multiplexer/demultiplexer is arranged to multiplex/demultiplex transmission/reception signals of two communication systems defining a first group in which the frequency bands are close to each other and transmission/reception signals of two communication systems defining a second group in which the frequency bands are close to each other, among transmission/reception signals of four communication systems; and the high frequency switch defined by the low-voltage control high-frequency switch is a high frequency switch at a side of switching between transmission/reception signals of at least one of a first reception signal switch that switches between reception signals of the two communication systems defining the first group and a second reception signal switch that switches between reception signals of the two communication systems defining the second group.

8. A composite high frequency component comprising a circuit of the composite high frequency component according to claim 5 being at least partially provided on a multilayer ceramic substrate.

* * * * *